(12) United States Patent
Kitazume (10) Patent No.: US 9,771,097 B2
(45) Date of Patent: Sep. 26, 2017

(54) ELECTRIC POWER STEERING APPARATUS

(71) Applicant: NSK LTD., Tokyo (JP)

(72) Inventor: Tetsuya Kitazume, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/032,091

(22) PCT Filed: Apr. 16, 2015

(86) PCT No.: PCT/JP2015/061673
§ 371 (c)(1),
(2) Date: Apr. 26, 2016

(87) PCT Pub. No.: WO2015/170559
PCT Pub. Date: Nov. 12, 2015

(65) Prior Publication Data
US 2017/0120948 A1 May 4, 2017

(30) Foreign Application Priority Data

May 8, 2014 (JP) .................................. 2014-096669

(51) Int. Cl.
*B62D 15/02* (2006.01)
*B62D 5/04* (2006.01)
*B62D 6/00* (2006.01)

(52) U.S. Cl.
CPC ......... *B62D 5/0466* (2013.01); *B62D 5/0409* (2013.01); *B62D 6/002* (2013.01); *B62D 15/0235* (2013.01)

(58) Field of Classification Search
CPC ........................... B62D 5/0466; B62D 5/0409
See application file for complete search history.

(56) References Cited

U.S. PATENT DOCUMENTS 7,423,397 B2 * 9/2008 Katahira ............... B62D 5/049
318/432
2002/0060538 A1 5/2002 Hara et al.
(Continued)

FOREIGN PATENT DOCUMENTS

JP 2004-25912 A 1/2004
JP 3551147 B2 8/2004
(Continued)

OTHER PUBLICATIONS

International Search Report for PCT/JP2015/061673 dated Jul. 7, 2015.
Written Opinion for PCT/JP2015/061673 dated Jul. 7, 2015.

*Primary Examiner* — Truc M Do
*Assistant Examiner* — Jess Whittington
(74) *Attorney, Agent, or Firm* — Sughrue Mion, PLLC (57) ABSTRACT

An active-return control section that calculates a return control current based on a steering angle, the vehicle speed and a motor angular velocity/Gr ratio, and drives the motor by a compensated-current command value obtained by subtracting the return control current from the current command value. The active-return control section includes a base-return control current calculating section that calculates a base-return control current, a target steering velocity calculating section that calculates a target steering velocity, a return control gain calculating section that obtains a deviation between the target steering velocity and the motor angular velocity/Gr ratio and sign-processes, and calculates a return control gain by at least two among a P-control calculation, an I-control calculation and a D-control calculation, a limiter that limits a maximum value of the return control gain, and a correcting section to output the return control current by correcting the control current with output of the limiter.

22 Claims, 8 Drawing Sheets (56) References Cited

U.S. PATENT DOCUMENTS

| | | | | |
|---|---|---|---|---|
| 2008/0114515 A1* | 5/2008 | Hara | .................... | B62D 5/0466 |
| | | | | 701/42 |
| 2009/0271069 A1* | 10/2009 | Yamamoto | ............. | B62D 6/008 |
| | | | | 701/41 |
| 2011/0118937 A1* | 5/2011 | Kariatsumari | ......... | B62D 5/046 |
| | | | | 701/41 |
| 2012/0097472 A1* | 4/2012 | Kubo | .................... | B62D 5/065 |
| | | | | 180/422 |

FOREIGN PATENT DOCUMENTS

| | | |
|---|---|---|
| JP | 2005-200019 A | 7/2005 |
| JP | 2007-99053 A | 4/2007 |
| JP | 2007-296900 A | 11/2007 |
| JP | 2009-12706 A | 1/2009 |
| JP | 2009-143368 A | 7/2009 |
| JP | 4872298 B2 | 2/2012 |

* cited by examiner

FIG.1

PRIOR ART

ELECTRIC POWER STEERING APPARATUS

CROSS REFERENCE TO RELATED APPLICATIONS

This application is a National Stage of International Application No. PCT/JP2015/061673 filed Apr. 16, 2015, claiming priority based on Japanese Patent Application No. 2014-096669 filed May 8, 2014, the contents of all of which are incorporated herein by reference in their entirety.

TECHNICAL FIELD

The present invention relates to an electric power steering apparatus that calculates a current command value based on a steering torque and a vehicle speed, drives a motor based on the current command value and assist-controls a steering system of a vehicle by a driving-control of the a motor, and in particular to an electric power steering apparatus that is capable of actively returning a handle (steering wheel) to a neutral point at a vehicle running state to return to a straight running state by compensating the current command value with a return-control current corresponding to a steering angle.

BACKGROUND ART

An electric power steering apparatus that energizes a steering apparatus of a vehicle by using a rotational torque of a motor as an assist torque, applies a driving force of the motor as the assist torque to a steering shaft or a rack shaft by means of a transmission mechanism such as gears or a belt through a reduction mechanism (reduction ratio=Gr). In order to accurately generate the assist torque (steering assist torque), such a conventional electric power steering apparatus performs a feedback control of a motor current. The feedback control adjusts a voltage supplied to the motor so that a difference between a current command value and the motor current becomes small, and the adjustment of the voltage applied to the motor is generally performed by an adjustment of a duty ratio of a pulse width modulation (PWM) control.

Figure 1:
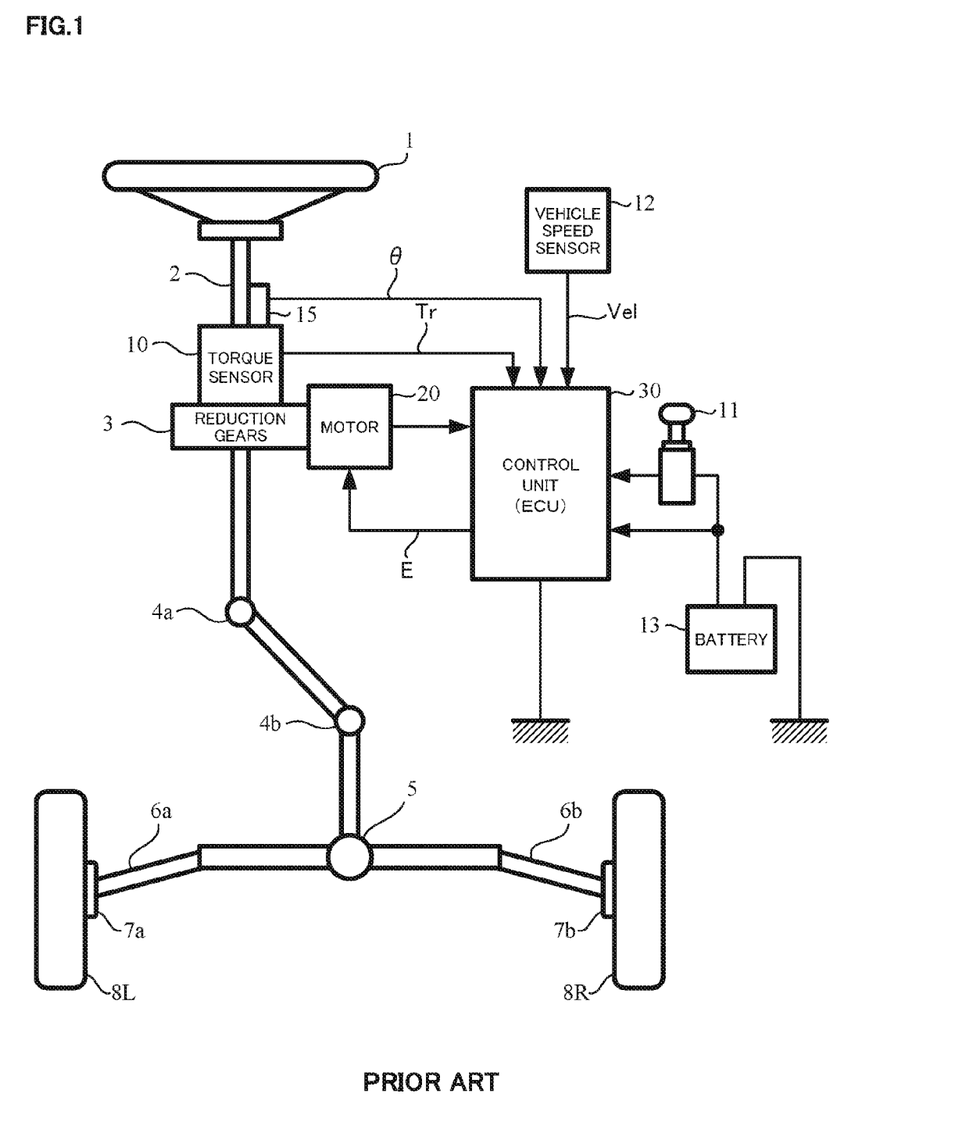
FIG. 1 is a diagram illustrating a constitution example of a general electric power steering apparatus.

A general constitution of a conventional electric power steering apparatus will be described with reference to FIG. 1. As shown in FIG. 1, a column shaft (a steering shaft, handle shaft) 2 connected to a steering wheel (handle) 1, is connected to steered wheels 8L and 8R through reduction gears 3 (reduction ratio=Gr), universal joints 4a and 4b, a rack and pinion mechanism 5, and tie rods 6a and 6b, further via hub units 7a and 7b. Further, the column shaft 2 is provided with a torque sensor 10 for detecting a steering torque Tr of the steering wheel 1, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command based on the steering torque Tr detected by the torque sensor 10 and a vehicle speed Vel detected by a vehicle speed sensor 12, and controls a current supplied to the motor 20 based on a voltage command value E obtained by performing compensation and so on with respect to the current command value in a current control section. Furthermore, it is also possible to receive the vehicle speed Vel from a CAN (Controller Area Network) and so on.

Figure 2:
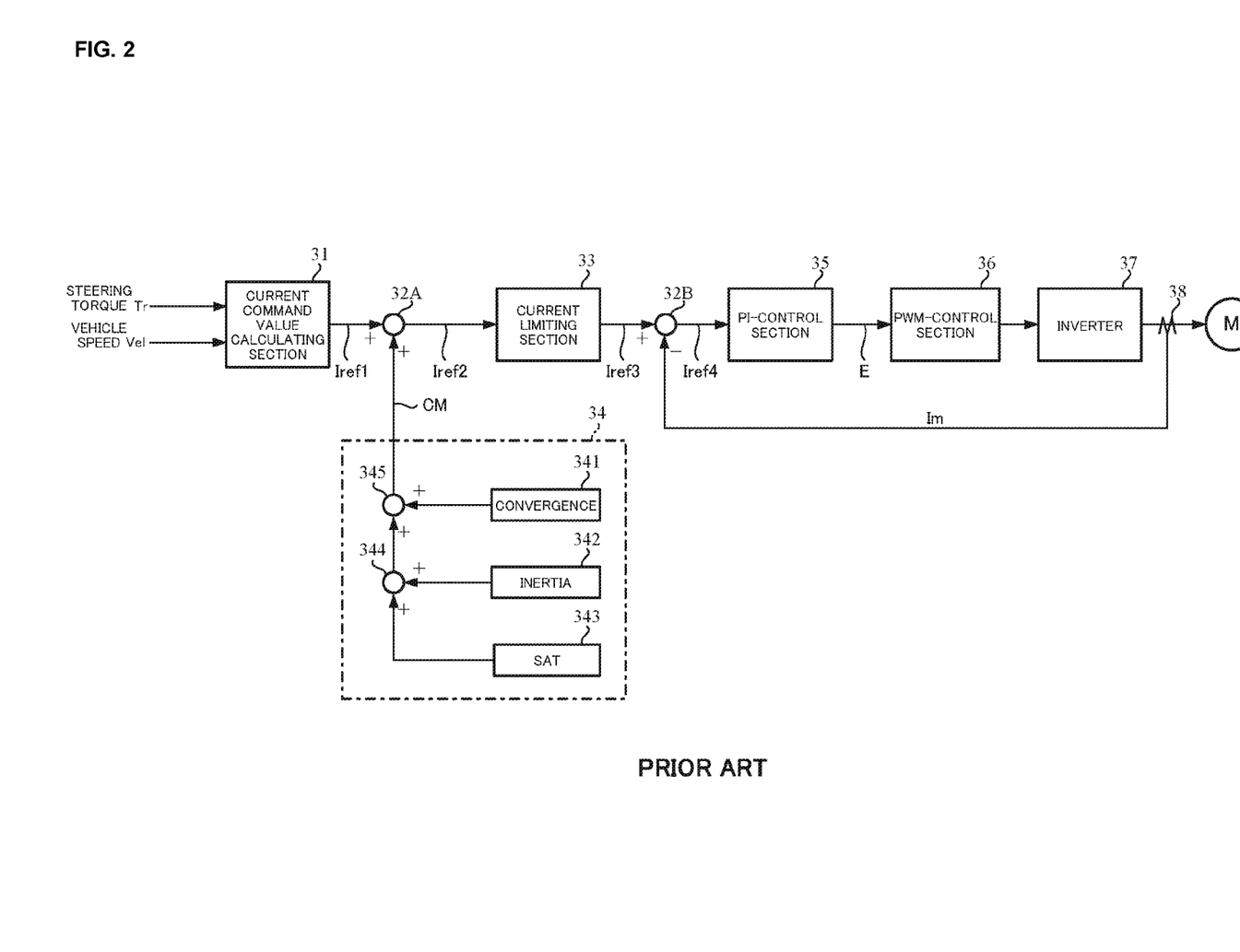
FIG. 2 is a block diagram showing an example of a control unit (ECU)

The control unit 30 mainly comprises a CPU (or an MPU or an MCU), and general functions performed by programs within the CPU are shown in FIG. 2.

Functions and operations of the control unit 30 will be described with reference to FIG. 2. As shown in FIG. 2, the steering torque Tr detected by the torque sensor 10 and the vehicle speed Vel detected by the vehicle speed sensor 12 are inputted into a current command value calculating section 31. The current command value calculating section 31 decides a current command value Iref1 that is the target value of the current supplied to the motor 20 based on the steering torque Tr and the vehicle speed Vel and by means of an assist map or the like. The current command value calculating section 31 may include a phase compensating section to improve the stability of the steering system, a center responsibility improving section to secure the stability at a dead band of the assist characteristic and to compensate the static friction, a robust stability compensating section to remove a peak value of the resonance frequency of the resonant system comprising an inertia element and a spring element including the detected torque and to compensate a phase shift of the resonance frequency for obstructing the stability and the responsibility of the control system and so on.

The current command value Iref1 is inputted into a current limiting section 33 through an adding section 32A as a current command value Iref2. A current command value Iref3 that is limited the maximum current, is inputted into a subtracting section 32B, and a deviation Iref4 (=Iref3−Im) between the current command value Iref3 and a motor current value Im that is fed back, is calculated. The deviation Iref4 is inputted into a PI-control section 35 serving as the current control section to improve the characteristic of the steering operation. The voltage command value E that characteristic improvement is performed in the PI-control section 35, is inputted into a PWM-control section 36. Furthermore, the motor 20 is PWM-driven through an inverter 37 serving as a drive section. The current value Im of the motor 20 is detected by a motor current detector 38 and is fed back to the subtracting section 32B. In general, the inverter 37 uses EFTs as switching elements and is comprised of a bridge circuit of FETs.

The current limiting section 33 is not indispensable.

Further, a compensation signal CM from a compensating section 34 is added to the adding section 32A, and the compensation of the system is performed by the addition of the compensation signal CM so as to improve a convergence, an inertia characteristic and so on. The compensating section 34 adds a self-aligning torque (SAT) 343 and an inertia 342 to an adding section 344, further adds the result of addition performed at the adding section 344 and a convergence 341 in an adding section 345, and then outputs the result of addition performed at the adding section 345 as the compensation signal CM.

In such the electric power steering apparatus, an operation is suffocated due to the friction of the reduction gears and the pinion and rack mechanism for transmitting the assist force. In spite of the vehicle running state in order to return to the straight running state, there is a case that the handle does not return to the neutral point and therefore the vehicle hardly becomes to the straight running state.

As a prior art for controlling an assist characteristic at an active-return time, the active-return control disclosed in Japanese Patent No. 4872298 (Patent Document 1) is proposed. In the control constitution disclosed in Patent Document 1, a target steering velocity is calculated from the steering angle, the vehicle speed and the steering torque and the compensation current is calculated in accordance with the deviation between the real motor angular velocity/Gr ration ratio and the target steering velocity

THE LIST OF PRIOR ART DOCUMENTS

Patent Documents

Patent Document 1: Japanese Patent No. 4872298 B2
Patent Document 2: Japanese Published Unexamined Patent Application No. 2007-99053 A1

SUMMARY OF THE INVENTION

Problems to be Solved by the Invention

In the active-return control, the target steering velocity calculated from the steering angle is generally set so that the target steering velocity becomes great in accordance with the increasing of the steering angle. However, for example during the turn driving, the driver tries to steer so that the real motor angular velocity/Gr ratio is small in the region in which the steering angle is great. In this time, since the deviation between the target steering velocity and the real motor angular velocity/Gr ratio becomes great, an output of the return control also tends to become great and therefore the driver feels the vehicle characteristic that the active-return feeling is strong. Further, since the compensation current is outputted due to the deviation at the turn steering time, the compensation output also varies corresponding to the motor angular velocity/Gr ratio. In this connection, the driver feels a spurious viscosity friction, but it is not necessarily needed to get the viscosity friction feeling due to the active-return control at the turning time.

In the active-return control in Patent Document 1, the above problems are avoided by lowering the target steering velocity in accordance with the steering torque of the driver. However, the steering torque variously and temporarily changes at a time of the rapid steering or the like, and thus there is a problem being felt as the uncomfortable steering by occurring the rapid changing of the compensation amount.

Further, although Japanese Published Unexamined Patent Application No. 2007-99053 (Patent Document 2) also discloses the technique of the active-return control, the deviation between the target steering velocity and the real motor angular velocity/Gr ratio is not used for the returning control. Accordingly, there is a problem to be impossible to control the steering velocity.

The present invention has been developed in view of the above-described circumstances, and an object of the present invention is to provide an electric power steering apparatus that is possible to actively return the steering wheel (handle) to the neutral point at the vehicle running state to give back to a straight running state by calculating the return control current corresponding to the steering angle and the motor angular velocity/Gr ratio and by compensating the current command value.

Means for Solving the Problems

The present invention relates to an electric power steering apparatus that calculates a current command value based on a steering torque and a vehicle speed, drives a motor by means of said current command value, and assist-controls a steering system by a driving and a controlling of said motor, the above-described object of the present invention is achieved by that comprising: an active-return control section that calculates a return control current based on a steering angle, the vehicle speed and a motor angular velocity/Gr ratio, and drives the motor by means of a compensated-current command value obtained by subtracting the return control current from the current command value, wherein the active-return control section comprises: a base-return control current calculating section that calculates abase-return control current based on the steering angle and the vehicle speed; a target steering velocity calculating section that calculates a target steering velocity based on the steering angle and the vehicle speed; a return control gain calculating section that obtains a deviation between the target steering velocity and the motor angular velocity/Gr ratio, sign-processes the deviation, and calculates a return control gain by using control calculations of at least two among a P-control calculation, an I-control calculation and a D-control calculation; a limiter that limits a maximum value of the return control gain; and a correcting section that corrects the base-return control current with an output gain of the limiter and outputs the return control current.

Further, the above-described object of the present invention is more effectively achieved by that wherein the return control gain calculating section comprises: a subtracting section to obtain the deviation between the target steering velocity and the motor angular velocity/Gr ratio; an inverting section to invert the deviation; a sign section to obtain a positive sign or a negative sign on the steering angle; a multiplying section to multiply an inverted deviation from the inverting section with the sign; and a control calculating section to output the return control gain by adding a result of a P-control calculation and a result of an I-control calculation for an output of the multiplying section: or wherein the return control gain calculating section comprises: a subtracting section to obtain the deviation between the target steering velocity and the motor angular velocity/Gr ratio; an inverting section to invert the deviation; a sign section to obtain a positive sign or a negative sign on the steering angle; a control calculating section to output the return control gain by adding a result of a P-control calculation and a result of an I-control calculation for an output of the inverting section; and a multiplying section to multiply the return control gain with the sign: or wherein the return control gain calculating section comprises: a subtracting section to obtain the deviation between the target steering velocity and the motor angular velocity/Gr ratio; an inverting section to invert the deviation; a sign section to obtain a positive sign or a negative sign on the steering angle; a control calculating section to output the return control gain by adding a result of a P-control calculation, a result of an I-control calculation and a result of a D-control calculation for an output of the inverting section; and a multiplying section to multiply the return control gain with the sign: or wherein the return control gain calculating section comprises: a subtracting section to obtain a second deviation between the target steering velocity and the steering velocity; a first inverting section to invert the second deviation; a sign section to obtain a positive sign or a negative sign on the steering angle; a second inverting section to invert the steering velocity; a control calculating section that P-control calculates and I-control calculates an output of the first inverting section, D-control calculates an output of the second inverting section, subtracts an output of the D-control calculation from an output of the I-control calculation, and outputs the return control gain by adding a result of the P-control calculation to a subtraction result; and a multiplying section to multiply the return control gain with the sign: or wherein the return control gain calculating section comprises: a subtracting section to obtain the deviation between the target steering velocity and the motor angular velocity/Gr ratio; a first inverting section to invert the deviation; a sign section to obtain a positive sign or a negative sign on the steering angle; a second inverting section to invert the steering velocity; a control calculating section that I-control calculates an output of the first inverting section, P-control calculates and D-control calculates an output of the second inverting section, subtracts an addition result of the P-control calculation and the D-control calculation from an output of the I-control calculation, and outputs the return control gain by subtracting an addition result of the P-control calculation and the D-control calculation from an output of the I-control; and a multiplying section to multiply the return control gain with the sign: or wherein the return control gain calculating section comprises: a subtracting section to obtain the deviation between the target steering velocity and the motor angular velocity/Gr ratio; a first inverting section to invert the deviation; a sign section to obtain a positive sign or a negative sign on the steering angle; a first multiplying section to multiply an inverted deviation from the first inverting section with the sign; a second inverting section to invert the steering velocity; a second multiplying section to multiply an inverted steering velocity from the second inverting section with the positive sign or the negative sign; and a control calculating section that I-control calculates an output of the first multiplying section, P-control calculates an output of the second multiplying section, and outputs the return control gain by subtracting an output of the P-control calculation from an output of the I-control calculation: or wherein the return control gain calculating section comprises: a subtracting section to obtain the deviation between the target steering velocity and the motor angular velocity/Gr ratio; a first inverting section to invert the deviation; a sign section to obtain a positive sign or a negative sign on the steering angle; a second inverting section to invert the steering velocity; a control calculating section that I-control calculates an output of the first inverting section, P-control calculates an output of the second inverting section, and outputs the return control gain by subtracting an output of the P-control calculation from an output of the I-control calculation; and a multiplying section to multiply the return control gain with the sign: or wherein the maximum value is "1.0" and the correcting section is a multiplying section: or wherein the base-return control current calculating section is a vehicle-speed sensitive, and the base-return control current has a radial characteristic of a point symmetry that: as an absolute value of the steering angle becomes greater than "0", the base-return control current gradually becomes great for a positive direction and a negative direction and gradually becomes small when the absolute value exceeds a determined value: or wherein the target steering velocity calculating section is a vehicle-speed sensitive, and the target steering velocity has a point symmetry characteristic that: as an absolute value of the steering angle becomes greater than "0", the base-return control current gradually becomes great for a positive direction and a negative direction.

Effects of the Invention

An electric power steering apparatus according to the present invention calculates a gain of an active-return control by the calculation with at least two control calculations among a P-control calculation (proportional control calculation), an I-control calculation (integral control calculation) and a D-control calculation (differential control calculation) in accordance with a deviation between a target steering velocity and a real motor angular velocity/Gr ratio, and calculates a compensation current by correcting (multiplying) a base-return control current corresponding to a steering angle by means of the gain. Since the present invention uses the base-return control current corresponding to the steering angle, even if the deviation between the target steering velocity and the real motor angular velocity/Gr ratio is great, a final absolute value of the return control current also becomes small if the absolute value of the base-return control current is small. Therefore, it is possible to set a suitable base-return control current. Moreover, since the return control current varies in accordance with the deviation between the target steering velocity and the real motor angular velocity/Gr ratio, it is possible to perform a smooth active-return control following to the target steering velocity.

Further, during the turn steering, although the gain of the return control is accumulated with the integral gain, the present invention can set the maximum return control current to the base-return control current by limiting (the maximum value=1.0) the value of the return control gain. Accordingly, the return control current corresponding to the steering angle is outputted during the return steering, it is possible to give a reaction force (being not the viscous feeling of the resistance force corresponding to the velocity) of the resistance force corresponding to the angle to the driver.

MODE FOR CARRYING OUT THE INVENTION

The present invention relates to an electric power steering apparatus that calculates a current command value based on a steering torque and a vehicle speed, drives a motor by means of the current command value, and assist-controls a steering system by a driving and a controlling of the motor. The electric power steering apparatus calculates a return control gain by the control-calculation such as a PI-control calculation (proportional-integral control calculation) or the like in accordance with a deviation between a target steering velocity and a real motor angular velocity/Gr ratio, corrects (multiplies) a base-return control current corresponding to a steering angle (vehicle speed) by means of the return control gain, and then calculates a return control current for the compensation of the current command value. Since the base-return control current corresponds to the steering angle, even if the deviation between the target steering velocity and the real motor angular velocity/Gr ratio is great, a final absolute value of the return control current also becomes small if the an absolute value of the base-return control current is small. Therefore, it is possible to set a suitable return control current. Moreover, since the return control current varies in accordance with the deviation between the target steering velocity and the real motor angular velocity/Gr ratio, it is possible to perform a smooth active-return control following to the target steering velocity.

Further, during the turn steering, although the value of the return control gain is accumulated with the integral gain, it is possible to set the maximum return control current to the base-return control current by limiting (the maximum value=1.0) the value of the return control gain. Accordingly, the return control current corresponding to the steering angle is outputted during the return steering, it is possible to give a reaction force (being not the viscous feeling of the resistance force corresponding to the velocity) of the resistance force corresponding to the steering angle to the driver.

Hereinafter, embodiments of the present invention will be described with reference to the accompanying drawings.

Figure 3:
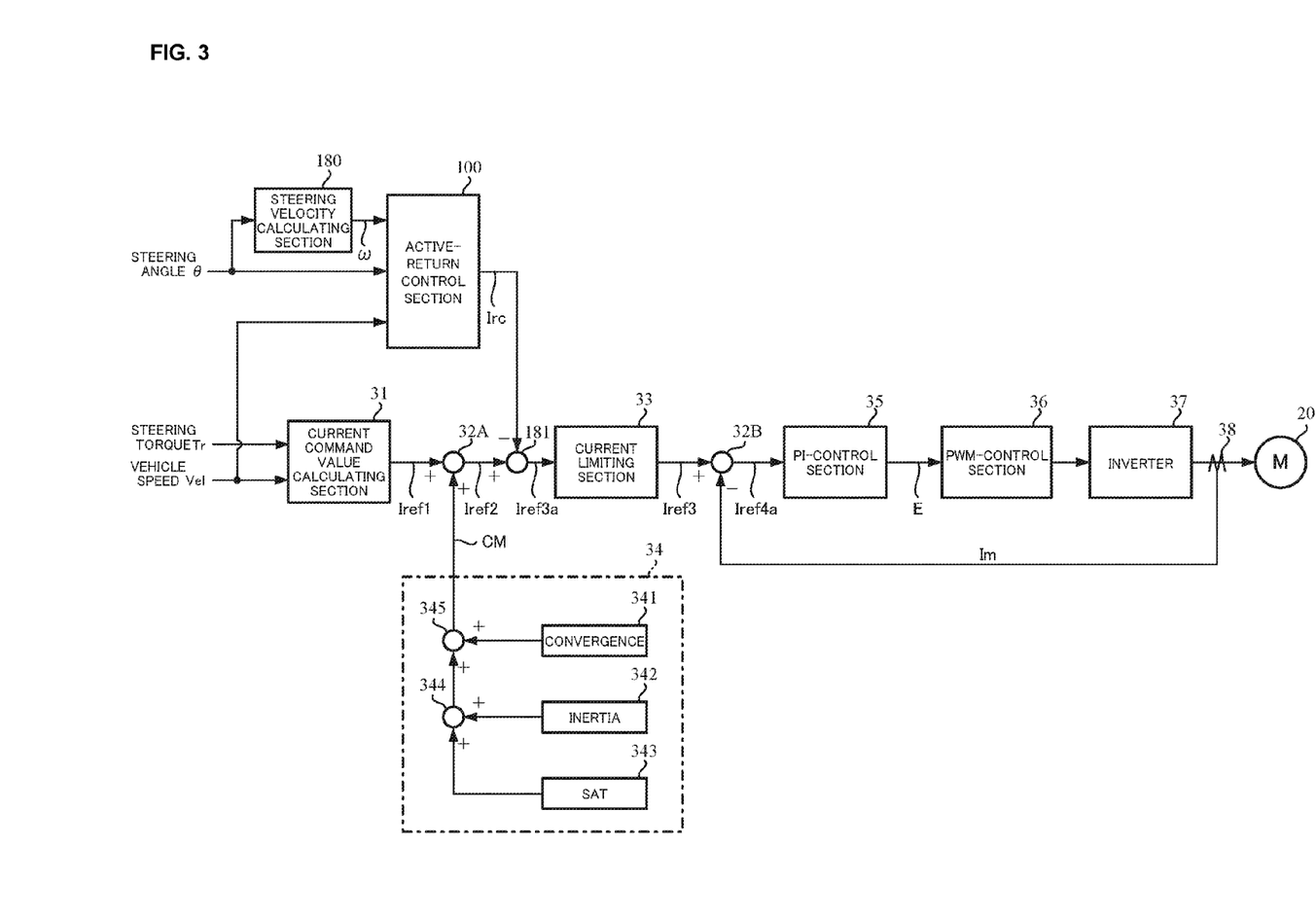
FIG. 3 is a block diagram showing a constitution example of electric power steering apparatus according to the present invention.

FIG. 3 shows a constitution example of the present invention corresponding to FIG. 2. As shown in FIG. 3, the present invention is provided with an active-return control section 100 to input a steering angle θ, a motor angular velocity/Gr ratio and a vehicle speed Vel, to calculate a return control current Irc and to output the return control current Irc. Further, there are provided a steering velocity calculating section 180 to calculate (differential) a steering velocity ω from the steering angle θ, and a subtracting section 181 to output a compensation current command value Iref3a by subtracting (correcting) the return control current Irc from a current command value Iref2.

Figure 4:
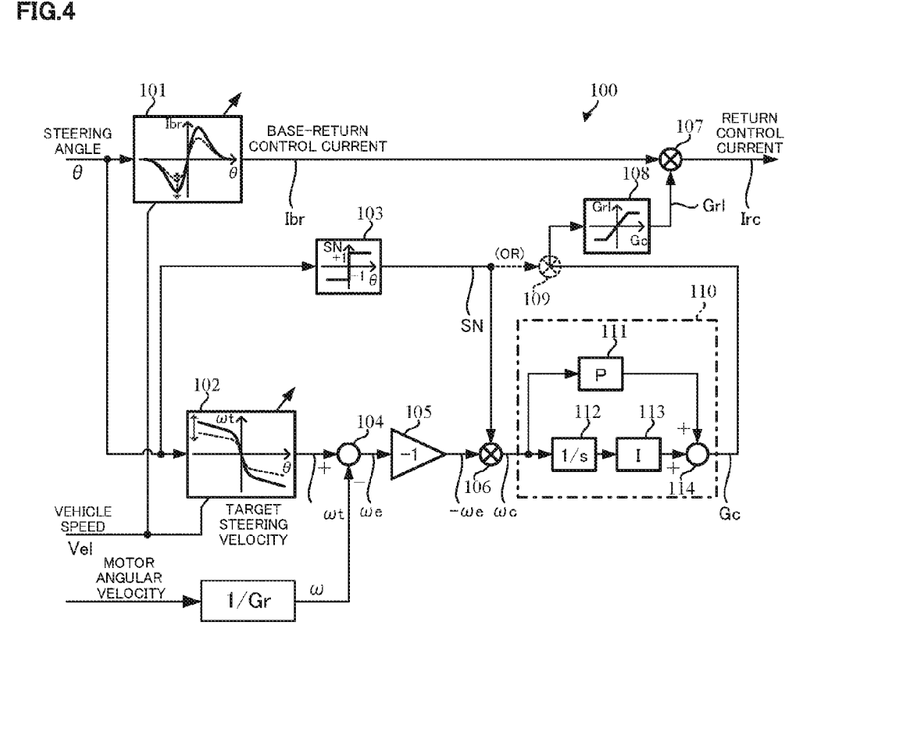
FIG. 4 is a block diagram showing a constitution example of a handle-return control section.
Figure 5:
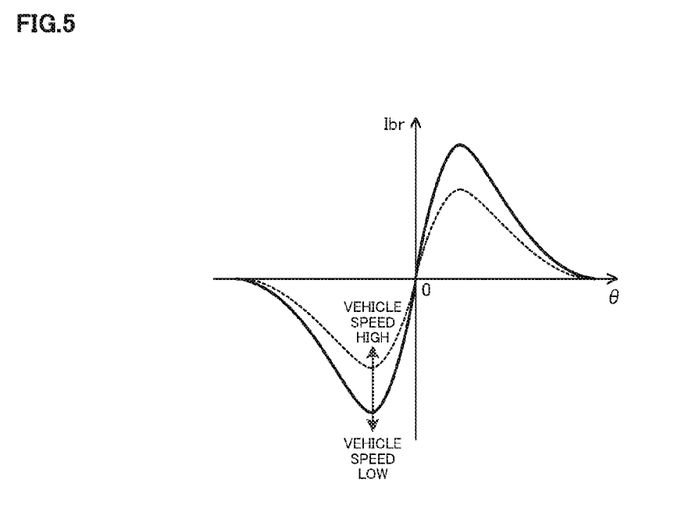
FIG. 5 is a characteristic diagram showing a characteristic example of a base-return control current calculating section.

The constitution of the active-return control section 100 is shown in FIG. 4, the steering angle θ is inputted into a base-return control current calculating section 101 and a target steering velocity calculating section 102, the vehicle speed Vel is also inputted into the base-return control current calculating section 101 and the target steering velocity calculating section 102, and both the base-return control current calculating section 101 and the target steering velocity calculating section 102 are vehicle speed sensitive characteristics. The characteristic of the base-return control current calculating section 101 is, as shown in FIG. 5, a radial characteristic of a point symmetry so that as a value of the steering angle θ becomes greater (smaller) than "0", the base-return control current Ibr becomes great in a positive (negative) direction, and gradually becomes small over a positive/negative determined value. That is, the base-return control current Ibr has a radial characteristic of a point symmetry that: the steering angle θ becomes greater than "0", the base-return control current Ibr gradually becomes great for a positive direction and a negative direction and gradually becomes small when the absolute value exceeds the determined value.

Figure 6:
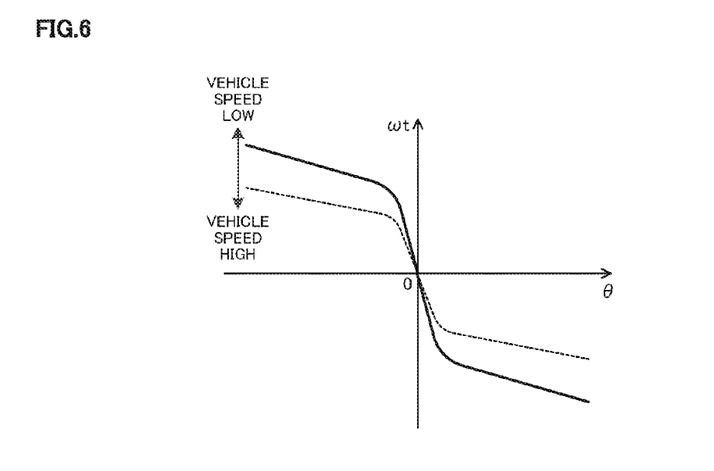
FIG. 6 is a characteristic diagram showing a characteristic example of a base-return control current calculating section.

In addition, the characteristic of the target steering velocity calculating section 102 is, as shown in FIG. 6, a point symmetry so that as a value of the steering angle θ becomes greater (smaller) than "0", a target steering velocity ωt becomes gradually great in a positive (negative) direction. That is, the characteristic is a point symmetry so that as the absolute value of the steering angle θ becomes greater than "0", the target steering velocity ωt becomes gradually great in the positive direction and the negative direction.

The base-return control current Ibr calculated at the base-return control current calculating section 101 is inputted into a multiplying section 107 serving as a correcting section, and the target steering velocity ωt calculated at the target steering velocity calculating section 101 is addition-inputted into the subtracting section 104. The steering velocity ω serving as the motor angular velocity/Gr ratio is subtraction-inputted into the subtracting section 104, the deviation ωe between the target steering velocity ωt and the motor angular velocity/Gr ratio obtained at the subtracting section 104 is inputted into an inverting section 105, and the inverted deviation "−ωe" is inputted into a multiplying section 106.

Figure 7:
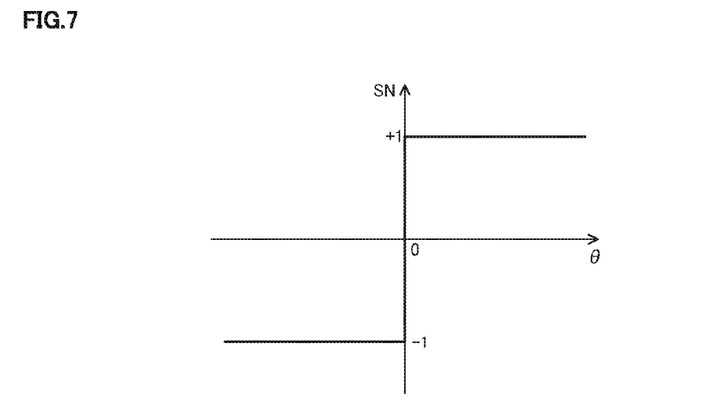
FIG. 7 is a characteristic diagram showing a characteristic example of a sign section.

Further, the steering angle θ is inputted into a sign section 103, and the sign section 103 outputs a sign SN that is "+1" in a positive side of the steering angle θ and is "−1" in a negative thereof as shown in FIG. 7. The sign SN is inputted into the multiplying section 106 and is multiplied with the inverted deviation "−ωe". A steering velocity ωc (=SN*(−ωe)) multiplied at the multiplying section 106 is inputted into a PI-control calculating section 110 serving as a control calculating section. Furthermore, the sign section 103, the subtracting section 104, the inverting section 105, the multiplying section 106 and the PI-control calculating section 110 constitute a return control gain calculating section.

The PI-control calculating section 110 comprises a proportional (P) calculating section 111 to proportional-control-calculate the steering velocity ωc, an integral (I) calculating section 112 to integral-calculate the steering velocity ωc, an integral gain section 113 to multiply an output of the integral calculating section 112 with an integral gain I, and an adding section 114 to output a return control gain Gc by adding outputs of the proportional calculating section 111 and the integral gain section 113. The PI-control calculating section 110 outputs the return control gain Gc by control-calculating for the steering velocity ωc.

Figure 8:
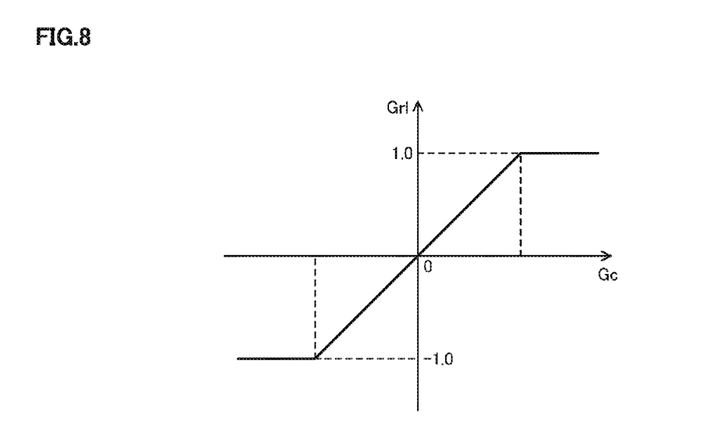
FIG. 8 is a characteristic diagram showing a characteristic example of a limiter.

The return control gain Gc control-calculated at the PI-control calculating section 110 is limited the maximum output value to "1.0" at a limiter 108 having a characteristic as shown in FIG. 8, and the return control gain Gc limited the maximum output value to "1.0" is inputted into a multiplying section 107. The multiplying section 107 multiplies the base-return control current Ibr and the return control gain Gc, and outputs the return control current Irc being a multiplied result. The return control current Irc is inputted into a subtracting section 181, and the compensation current command value Iref3a that the return control current Irc is subtracted from the current command value Iref2, is generated.

Figure 9:
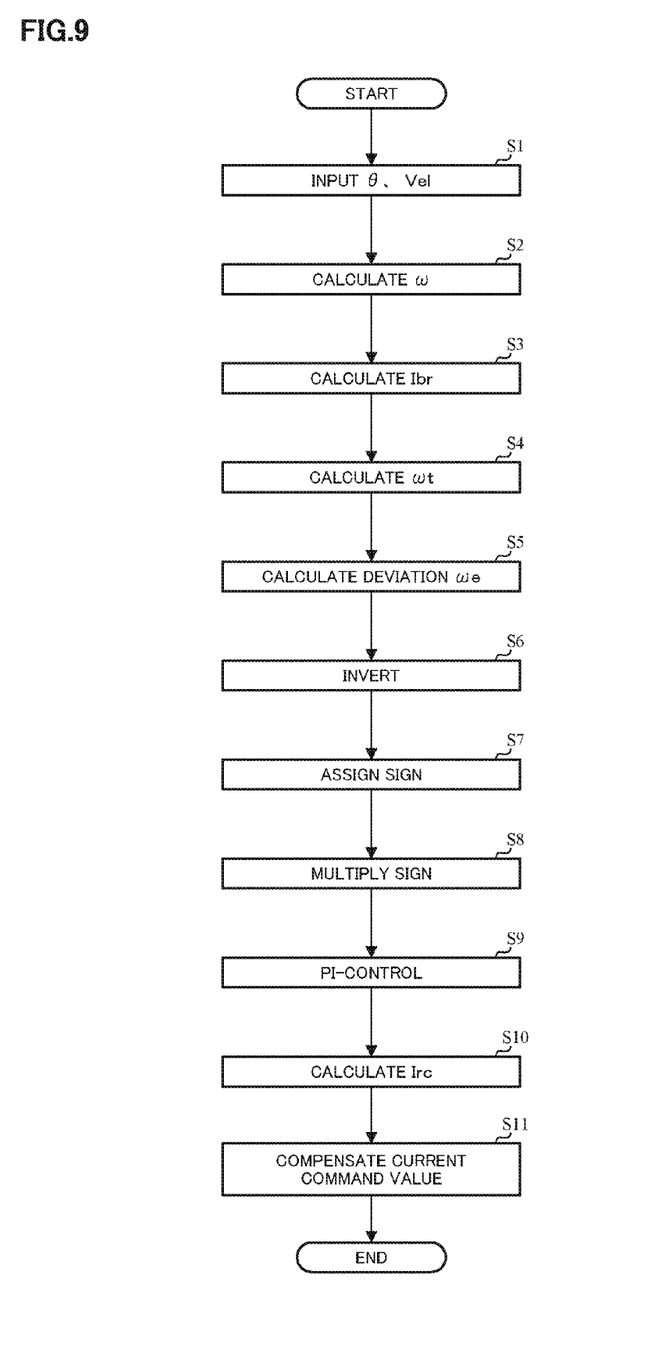
FIG. 9 is a flow chart showing an example operation of the present invention.

In such a constitution, an operation example of the present invention will be described with reference to a flow chart of FIG. 9.

First, the steering angle θ from the steering angle sensor 15 and the vehicle speed Vel from the vehicle speed sensor 12 are inputted and are read-out (Step S1). The steering velocity calculating section 180 obtains the steering velocity ω from the steering angle θ by the calculation (differential) (Step S2). The steering angle θ and the vehicle speed Vel may input from CAN.

The base-return control current calculating section 101 calculates the base-return control current Ibr based on the steering angle θ and the vehicle speed Vel and inputs it into the multiplying section 107 (Step S3). Further, the target steering velocity calculating section 102 calculates the target steering velocity ωt based on the steering angle θ and the vehicle speed Vel (Step S4), the subtracting section 104 calculates the deviation ωe between the steering velocity (the motor angular velocity/Gr ratio) ω and the target steering velocity ωt (Step S5), and the inverting section 105 inverts the deviation ωe and then inputs the inverted deviation "−ωe" into the multiplying section 106 (Step S6).

Furthermore, the sign section 103 calculates the sign SN for the steering angle θ (Step S7), the deviation "−ωe" is multiplied with the sign SN at the multiplying section 106 (Step S8), and the deviation ωc assigned the sign is inputted into the PI-control calculating section 110. The PI-control calculating section 110 performs the proportional control calculation by means of the proportional calculating section 111 and the integral control calculation by means of the integral calculating section 112 and the integral gain section 113, and then performs the addition of the proportional control calculation and the integral control calculation at the adding section 114. Then, the return control gain Gc is outputted from the adding section 114 (Step S9). The return control gain Gc is limited the maximum value to "1.0" at the limiter 108 and then is inputted into the multiplying section 107, and the return control current Irc is outputted by correcting (multiplying) the base-return control current Irc with the return control gain Gc (Step S10). The return control current Irc is subtraction-inputted into the subtracting section 181, and the compensated current command value Iref3 in which the return control current Irc is subtracted, is generated (Step S11). Hereinafter, the steering controls similar to above operations are performed.

As stated above, the present invention calculates the base-return control current Ibr based on the steering angle θ and the vehicle speed Vel, whereby it is possible to be great the return control current Irc in a bad vehicle status when an SAT (Self-Aligning Torque) is small and the active-return is bad, and to be small the return control current Irc in a vehicle status when the SAT is great and the active-return is good. Further, the active-return control is not performed in the vehicle speed region such a static steering not to be necessary the active-return.

Since the target steering velocity ωt is the target velocity of the active-return steering time, the target steering velocity wt is defined as negative when the steering angle θ is positive and the target steering velocity ωt is defined as positive when the steering angle θ is negative as shown in FIG. 6. By inverting the sign of the deviation ωe and multiplying the sign SN of the steering angle θ, in a case that the steering angle θ coincides with the steering velocity ω, the deviation ωc after the sign assignment is positive when the steering velocity fast returns than the target steering velocity ωt and the deviation ωc after the sign assignment is negative when the steering velocity lately returns than the target steering velocity ωt. By obtaining the return control gain Gc at the PI-control calculating section 110 by inputting the deviation ωc after the sign assignment, the return control gain Gc becomes greater in the negative direction as the steering velocity ω is fast than the target steering velocity ωt and does greater in the positive direction as the steering velocity ω is late than the target steering velocity ωt. The return control current Irc is obtained by multiplying the base-return control current Ibr with the return control gain Gc and by correcting. The return control current Irc variously changes (increases and decreases) due to the deviation ωe, the return assist torque for returning to the center (neutral point) is made great when the steering velocity is late than the target steering velocity ωt. When the steering velocity is fast than the target steering velocity ωt, the return assist torque is made small or is outputted as a brake torque for suppressing the velocity.

Since the present invention obtains the return control gain Gc from the deviation ωe by means of the PI-control calculating section 11o and makes the return control current Irc to change, it is possible to realize the smooth active-return control so as to return with the target steering velocity ωt. In addition, the return control gain Gc is multiplied with the base-return control current Ibr after being limited to the maximum value at the limiter 108 and the upper limit value of the limiter 108 is "1.0". In a case of the turning steering, the steering velocity ω is positive when the steering angle θ is positive. The target steering velocity ωt is negative at the time, the deviation ωe is surely negative because of subtracting the positive steering angle θ from the negative target steering velocity ωt. The deviation ωe after the sign assignment is inverted and becomes positive since the inverted deviation is multiplied with the sign SN of the steering angle θ. Therefore, the integral value of the PI-control calculating section 110 is accumulated in the positive direction. By providing the limiter 108 at a rear stage of the PI-control calculating, the upper limit of the return control gain Gc is fixed to "1.0". As a result, the base-return control current Ibr is directly outputted serving as the return control current Irc. In this way, in the return time, the return control current Irc is outputted serving as the compensation amount corresponding to the steering angle θ and the vehicle speed Vel, since the steering velocity ω does not relate to the compensation amount, it is possible to give a pseudo road-surface reaction force to the driver without the viscous feeling.

In FIG. 4, the deviation "−ωe" is multiplied with the sign SN at the multiplying section 106 and the multiplied result is inputted into the PI-control calculating section 110. The apparatus may constitute as shown by the dashed-line in FIG. 4. That is, there is provided a multiplying section 109 at an output portion of the PI-control calculating section 110, the deviation "−ωe" is directly inputted into the PI-control calculating section 110, the return control gain Gc from the PI-control calculating section 110 is multiplied with the sign SN at the multiplying section 109, and the multiplied result is inputted into the limiter 108.

FIG. 10-FIG. 13 show another constitution examples of the return control gain calculating section in the active-return control section 100 corresponding to FIG. 4. Hereinafter, embodiments will be described.

Figure 10:
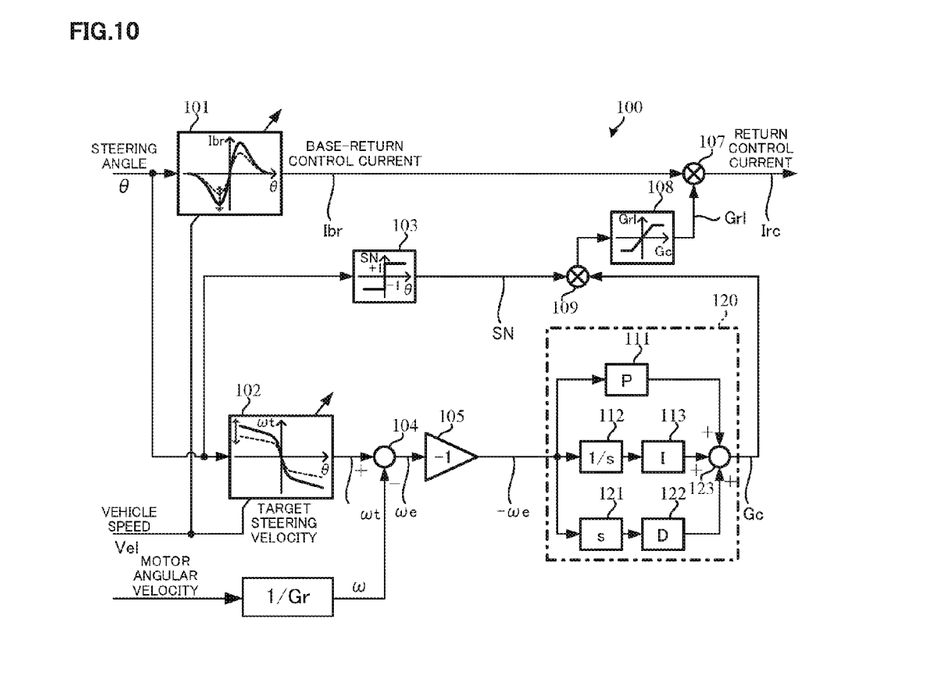
FIG. 10 is a block diagram showing another example of an active-return control section.

The embodiment shown in FIG. 10 adds a differential (D) control calculation to the constitution of the PI-control calculating section 110 of FIG. 4 and constitutes a PID-control calculating section 120, and deletes the multiplying section 106 and there is provided a multiplying section 109 to multiply the sign SN at an output portion of the PID-control calculating section 120 instead of the multiplying section 106. Namely, there are, as the D-control calculation, provided a differential (D) calculating section 121 to differential-calculate the steering velocity ωc and a differential gain section 122 to multiply an output of the differential calculating section 121 with the differential gain D, and outputs of the differential gain section 122, the proportional calculating section 111 and the integral gain section 113 are added in the adding section 123 and then the return control gain Gc is outputted. The return control gain Gc is multiplied with the sign SN at the multiplying section 109 and then the multiplied result is inputted into the limiter 108.

In the present embodiment, the sign section 103, the subtracting section 104, the inverting section 105, the multiplying section 109 and the PID-control calculating section 120 constitute the return control gain calculating section.

Since the differential (D) control makes the control gain to change due to the changing amount in the present embodiment, the control gain becomes great when the changing amount of the deviation is great. Accordingly, by addition of the differential (D) control, it is possible to improve the control responsibility for the target steering velocity.

Figure 11:
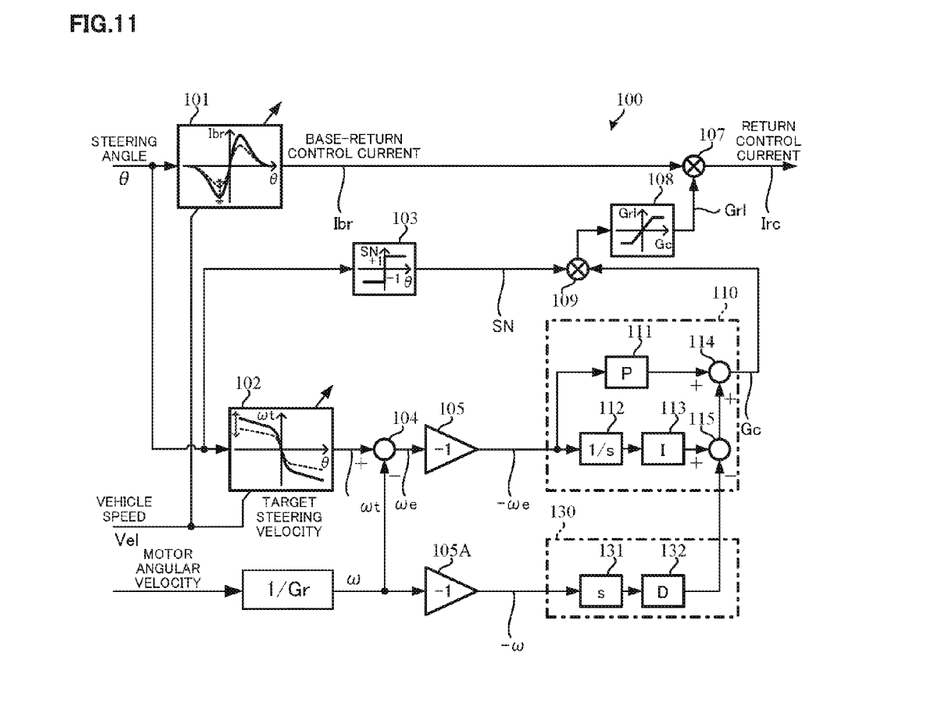
FIG. 11 is a block diagram showing another example of an active-return control section.

The embodiment shown in FIG. 11 is constituted by adding a D-preceding type control calculation to the PI-control calculation and the PI-control calculating section 110 and the D-control calculating section 130 are provided as the control calculating section, and further the multiplying section 109 is provided at an output portion of the PI-control calculating section 110. In addition, the inverting section 105A to invert the steering velocity ω is provided, the inverted steering velocity "−ω" is differential-calculated at the differential calculating section 131 in the D-control calculating section 130 and is multiplied with the differential gain D at the differential gain section 132. The multiplied result is subtraction-inputted into the subtracting section 115 in the PI-control calculating section 110. The result of the integral calculation is also inputted into the subtracting section 115, and the difference is added to the result of the proportional calculation at the adding section 114 and then the return control gain Gc is outputted. The return control gain Gc is multiplied with the sign SN at the multiplying section 109 and then the multiplied result is inputted into the limiter 108.

In the present embodiment, the sign section 103, the subtracting section 104, the inverting section 105A, the multiplying section 109, the PID-control calculating section 110 and the D-control calculating section 130 constitute the return control gain calculating section.

In the differential-preceding type PID-control according to this embodiment, the input signal of the differential (D) control is not the deviation and is the steering velocity, and even if the target steering velocity suddenly varies, the output of the differential (D) control varies, the rapid changing of the return control gain is prevented and the differential (D) control acts for the steering velocity changing due to the external disturbance. In this way, it is possible to realize the smooth active-return control.

Figure 12:
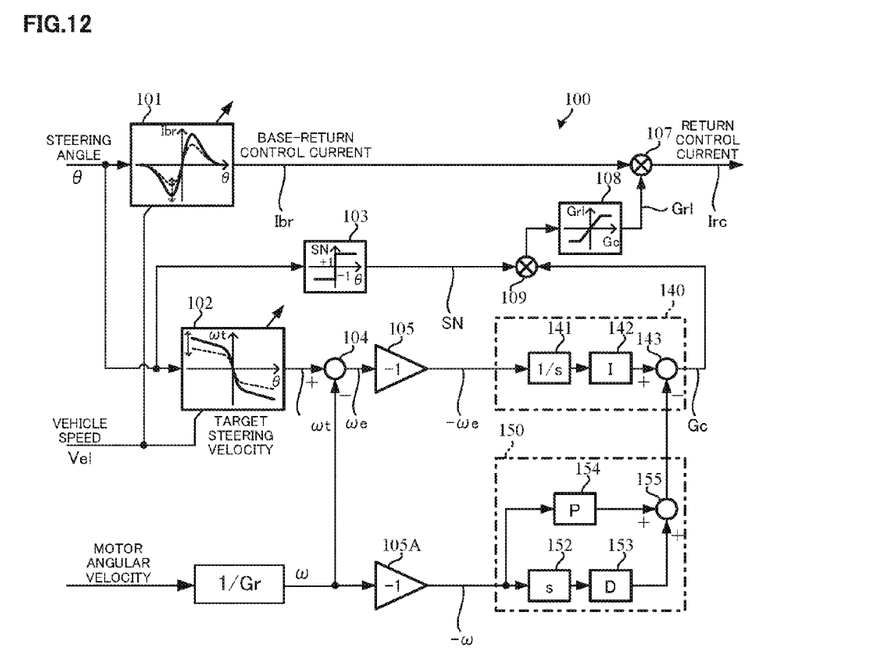
FIG. 12 is a block diagram showing another example of an active-return control section.

The embodiment shown in FIG. 12 is an I-P-D-control calculating section which is constituted by adding a PD-preceding type control calculation to the I-control calculation and the I-control calculating section 140 and the PD-control calculating section 150 are provided as the control calculating section. In addition, the inverting section 105A to invert the steering velocity ω is similarly provided like the above embodiment, the inverted steering velocity "−ω" is P-control-calculated at the proportional calculating section 154 in the PD-control calculating section 150, is differential-calculated at the differential calculating section 152 and is multiplied with the differential gain D at the differential gain section 152. The proportional calculation result and the differential calculation result are added at the adding section 155. The addition result at the adding section 155 is subtraction-inputted into the subtracting section 143 in the I-control calculating section 140. The steering velocity "−ω" from the inverting section 105 is integral-calculated at the integral calculating section 141 in the I-control calculating section 140, is multiplied with the integral gain I at the integral gain section 142 and then is also addition-inputted into the subtracting section 143. The subtracting section 143 subtracts a result of the PD-control calculating section 150 from the integral calculation result of the I-control calculating 140 and then outputs the return control gain Gc. The return control gain Gc is multiplied with the sign SN at the multiplying section 109 and then the multiplied result is inputted into the limiter 108.

In the present embodiment, the sign section 103, the subtracting section 104, the inverting sections 105 and 105A, the multiplying section 109, the I-control calculating section 140 and the PD-control calculating section 150 constitute the return control gain calculating section.

In the proportional-differential-preceding type PID-control according to this embodiment, the input signal of the differential (D) control is not the deviation and is the steering velocity, and even if the target steering velocity suddenly varies, the respective outputs of the proportional (P) control and the differential (D) control vary, the rapid changing of the return control gain is prevented and the proportional (P) control and the differential (D) control act for the steering velocity changing due to the external disturbance. In this way, it is possible to realize the smooth active-return control.

Figure 13:
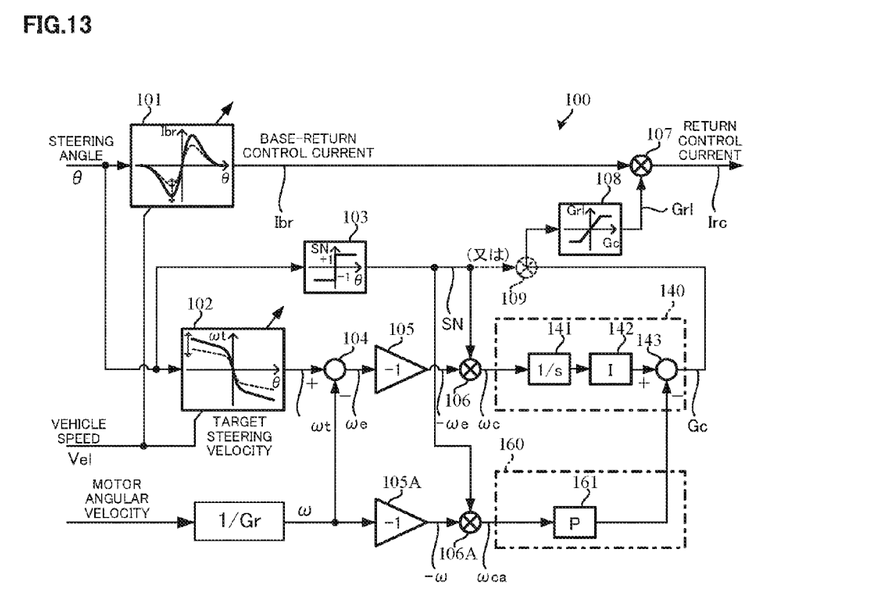
FIG. 13 is a block diagram showing another example of an active-return control section.

The embodiment shown in FIG. 13 is an I-P-control calculating section which is constituted by adding a P-preceding type control calculation to the I-control calculation and the I-control calculating section 140 and the P-control calculating section 160 are provided as the control calculating section. In addition, the inverting sections 105A and 106A are similarly provided like the above embodiment shown in FIG. 11, a multiplied result of the multiplying section 106A is proportional-calculated at the proportional calculating section 161 in the P-control calculating section 160 and is subtraction-inputted into the subtracting section 143 in the I-control calculating section 140. The steering velocity ω is integral-calculated at the integral calculating section 141 in the I-control calculating section 140, is multiplied with the integral gain I at the integral gain section 142 and then is also addition-inputted into the subtracting section 143. The subtracting section 143 subtracts a result of the PD-control calculating section 150 from the integral calculation result of the I-control calculating 140 and then outputs the return control gain Gc.

In FIG. 13, the deviation "−ωe" is multiplied with the sign SN at the multiplying section 106 and the multiplied result is inputted into the I-control calculating section 140 as well as the steering velocity ω is multiplied with the sign SN at the multiplying section 106A and the multiplied result is inputted into the P-control calculating section 160. The apparatus may constitute as shown by the dashed-line in FIG. 13. That is, there is provided a multiplying section 109 at an output portion of the I-control calculating section 140, the deviation "−ωe" is directly inputted into the I-control calculating section 140 and the steering velocity "−ω" is directly inputted into the P-control calculating section 160, the return control gain Gc from the I-control calculating section 140 is multiplied with the sign SN at the multiplying section 109, and the multiplied result is inputted into the limiter 108.

In the present embodiment, the sign section 103, the subtracting section 104, the inverting sections 105 and 105A, the multiplying sections 106 and 106A (or 109), the I-control calculating section 140 and the P-control calculating section 160 constitute the return control gain calculating section.

Since the proportional-preceding type PI-control according to the embodiment does not have the differential control, it is possible to simplify the control logic. Further, the input signal of the proportional (P) control is not the deviation and is the steering velocity, and even if the target steering velocity suddenly varies, the output of the proportional (P) control varies, the rapid changing of the return control gain is prevented and the proportional (P) control acts for the steering velocity changing due to the external disturbance. In this way, it is possible to realize the smooth active-return control.

EXPLANATION OF REFERENCE NUMERALS 1 handle (steering wheel)
2 column shaft (steering shaft, handle shaft)
3 reduction gears
10 torque sensor
12 vehicle speed sensor
11 ignition key
13 battery
20 motor
30 control unit (ECU)
100 active-return control section
101 base return control current calculating section
102 target steering velocity calculating section
103 sign section
105, 105A inverting section
108 limiter
110 PI-control calculating section
120 PID-control calculating section
130 D-control calculating section
140 I-control calculating section
150 PD-control calculating section
160 P-control calculating section
180 steering velocity calculating section

The invention claimed is:

1. An electric power steering apparatus that calculates a current command value based on a steering torque and a vehicle speed, drives a motor by means of said current command value, and assist-controls a steering system by a driving and a controlling of said motor, comprising:
an active-return control section that calculates a return control current based on a steering angle, said vehicle speed and a motor angular velocity/Gr ratio, and drives said motor by means of a compensated-current command value obtained by subtracting said return control current from said current command value,
wherein said active-return control section comprises:
a base-return control current calculating section that calculates a base-return control current based on said steering angle and said vehicle speed;
a target steering velocity calculating section that calculates a target steering velocity based on said steering angle and said vehicle speed;
a return control gain calculating section that obtains a deviation between said target steering velocity and said motor angular velocity/Gr ratio, sign-processes said deviation, and calculates a return control gain by using control calculations of at least two among a Proportional-control calculation, an Integration-control calculation and a Derivative-control calculation;
a limiter that limits a maximum value of said return control gain; and
a correcting section that corrects said base-return control current with an output gain of said limiter and outputs said return control current.

2. The electric power steering apparatus according to claim 1, wherein said return control gain calculating section comprises:
a subtracting section to obtain said deviation between said target steering velocity and said motor angular velocity/Gr ratio;
an inverting section to invert said deviation;
a sign section to obtain a positive sign or a negative sign on said steering angle;
a multiplying section to multiply an inverted deviation from said inverting section h said sign; and
a control calculating section to output said return control gain by adding a result of the Proportional-control calculation and a result of the Integration-control calculation for an output of said multiplying section.

3. The electric power steering apparatus according to claim 1, wherein said return control gain calculating section comprises:
a subtracting section to obtain said deviation between said target steering velocity and said motor angular velocity/Gr ratio;
an inverting section to invert said deviation;
a sign section to obtain a positive sign or a negative sign on said steering angle;
a control calculating section to output said return control gain by adding a result of the Proportional-control calculation and a result of the Integration-control calculation for an output of said inverting section; and
a multiplying section to multiply said return control gain with said sign.

4. The electric power steering apparatus according to claim 1, wherein said return control gain calculating section comprises:
a subtracting section to obtain said deviation between said target steering velocity and said motor angular velocity/Gr ratio;
an inverting section to invert said deviation;
a sign section to obtain a positive sign or a negative sign on said steering angle;
a control calculating section to output said return control gain by adding a result of the Proportional-control calculation, a result of the integration-control calculation and a result of the Derivative-control calculation for an output of said inverting section; and
a multiplying section to multiply said return control gain with said sign.

5. The electric power steeling apparatus according to claim 1, wherein said return control gain calculating section comprises:
a subtracting section to obtain a second deviation between said target steering velocity and said steering velocity;
a first inverting section to invert said second deviation;
a sign section to obtain a positive sign or a negative sign on said steering angle;
a second inverting section to invert said steering velocity;
a control calculating section that Proportional-control calculates and Integration-control calculates an output of said first inverting section, Derivative-control calculates an output of said second inverting section, subtracts an output of said Derivative-control calculation from an output of said Integration-control calculation, and outputs said return control gain by adding a result of said Proportional-control calculation to a subtraction result; and a multiplying section to multiply said return control gain with said sign.

6. The electric power steering apparatus according to claim 1, wherein said return control gain calculating section comprises:
   a subtracting section to obtain said deviation between said target steering velocity and said motor angular velocity/Gr ratio;
   a first inverting section to invert said deviation;
   a sign section to obtain a positive sign or a negative sign on said steering angle;
   a second inverting section to invert said steering velocity;
   a control calculating section that Integration-control calculates an output of said first inverting section, Proportional-control calculates and Derivative-control calculates an output of said second inverting section, subtracts an addition result of said Proportional-control calculation and said Derivative-control calculation from an output of said Integration-control calculation, and outputs said return control gain by subtracting an addition result of said Proportional-control calculation and said Derivative-control calculation from an output of said Integration-control; and
   a multiplying section to multiply said return control gain with said sign.

7. The electric power steering apparatus according to claim 1, wherein said return control gain calculating section comprises:
   a subtracting section to obtain said deviation between said target steering velocity and said motor angular velocity/Gr ratio;
   a first inverting section to invert said deviation;
   a sign section to obtain a positive sign or a negative sign on said steering angle;
   a first multiplying section to multiply an inverted deviation from said first inverting section with said sign;
   a second inverting section to invert said steering velocity;
   a second multiplying section to multiply an inverted steering velocity from said second inverting section with said positive sign or said negative sign; and
   a control calculating section that Integration-control calculates an output of said first multiplying section, Proportional-control calculates an output of said second multiplying section, and outputs said return control gain by subtracting an output of said Proportional-control calculation from an output of said Integration-control calculation.

8. The electric power steeling apparatus according to claim 1, wherein said return control gain calculating section comprises:
   a subtracting section to obtain said deviation between said target steering velocity and said motor angular velocity/Gr ratio;
   a first inverting section to invert said deviation;
   a sign section to obtain a positive sign or a negative sign on said steering angle;
   a second inverting section to invert said steering velocity;
   a control calculating section that Integration-control calculates an output of said first inverting section, Proportional-control calculates an output of said second inverting section, and outputs said return control gain by subtracting an output of said Proportional-control calculation from an output of said Integration-control calculation; and
   a multiplying section to multiply said return control gain with said sign.

9. The electric power steering apparatus according to claim 1, wherein said maximum value is "1.0" and said correcting section is a multiplying section.

10. The electric power steering apparatus according to claim 1, wherein said base-return control current calculating section is vehicle-speed sensitive, and said base-return control current has a radial characteristic of a point symmetry that: as an absolute value of said steering angle becomes greater than "0", said base-return control current gradually becomes great for a positive direction and a negative direction and gradually becomes small when said absolute value exceeds a determined value.

11. The electric power steering apparatus according to claim 2, wherein said base-return control current calculating section is vehicle-speed sensitive, and said base-return control current has a radial characteristic of a point symmetry that: as an absolute value of said steering angle becomes greater than "0", said base-return control current gradually becomes great for a positive direction and a negative direction and gradually becomes small when said absolute value exceeds a determined value.

12. The electric power steering apparatus according to claim 3, wherein said base-return control current calculating section is vehicle-speed sensitive, and said base-return control current has a radial characteristic of a point symmetry that: as an absolute value of said steering angle becomes greater than "0", said base-return control current gradually becomes great for a positive direction and a negative direction and gradually becomes small when said absolute value exceeds a determined value.

13. The electric power steering apparatus according to claim 4, wherein said base-return control current calculating section is vehicle-speed sensitive, and said base-return control current has a radial characteristic of a point symmetry that: as an absolute value of said steering angle becomes greater than "0", said base-return control current gradually becomes great for a positive direction and a negative direction and gradually becomes small when said absolute value exceeds a determined value.

14. The electric power steering apparatus according to claim 5, wherein said base-return control current calculating section is vehicle-speed sensitive, and said base-return control current has a radial characteristic of a point symmetry that: as an absolute value of said steering angle becomes greater than "0", said base-return control current gradually becomes great for a positive direction and a negative direction and gradually becomes small when said absolute value exceeds a determined value.

15. The electric power steering apparatus according claim 6, wherein said base-return control current calculating section is vehicle-speed sensitive, and said base-return control current has a radial characteristic of a point symmetry that: as an absolute value of said steering angle becomes greater than "0", said base-return control current gradually becomes great for a positive direction and a negative direction and gradually becomes small when said absolute value exceeds a determined value.

16. The electric power steering apparatus according to claim 7, wherein said base-return control current calculating section is vehicle-speed sensitive, and said base-return control current has a radial characteristic of a point symmetry that: as an absolute value of said steering angle becomes greater than "0", said base-return control current gradually becomes great for a positive direction and a negative direction and gradually becomes small when said absolute value exceeds a determined value.

17. The electric power steering apparatus according to claim 8, wherein said base-return control current calculating section is vehicle-speed sensitive, and said base-return control current has a radial characteristic of a point symmetry that: as an absolute value of said steering angle becomes greater than "0", said base-return control current gradually becomes great for a positive direction and a negative direction and gradually becomes small when said absolute value exceeds a determined value.

18. The electric power steering apparatus according to claim 9, wherein said base-return control current calculating section is vehicle-speed sensitive, and said base-return control current has a radial characteristic of a point symmetry that: as an absolute value of said steering angle becomes greater than "0", said base-return control current gradually becomes great for a positive direction and a negative direction and gradually becomes small when said absolute value exceeds a determined value.

19. The electric power steering apparatus according to claim 1, wherein said target steering velocity calculating section is vehicle-speed sensitive, and said target steering velocity has a point symmetry characteristic that: as an absolute value of said steering angle becomes greater than "0", said base-return control current gradually becomes great for a positive direction and a negative direction.

20. The electric power steering apparatus according to claim 9, wherein said target steering velocity calculating section is vehicle-speed sensitive, and said target steering velocity has a point symmetry characteristic that: as an absolute value of said steering angle becomes greater than "0", said base-return control current gradually becomes great for a positive direction and a negative direction.

21. The electric power steering apparatus according claim 10, wherein said target steering velocity calculating section is vehicle-speed sensitive, and said target steering velocity has a point symmetry characteristic that: as an absolute value of said steering angle becomes greater than "0", said base-return control current gradually becomes great for a positive direction and a negative direction.

22. The electric power steering apparatus according to claim 7, wherein said target steering velocity calculating section is vehicle-speed sensitive, and said target steering velocity has a point symmetry characteristic that: as an absolute value of said steering angle becomes greater than "0", said base-return control current gradually becomes great for a positive direction and a negative direction.

\* \* \* \* \*